Jan. 13, 1942. H. R. TRAPHAGEN 2,269,798
PLANTING MEANS
Filed Nov. 12, 1938 2 Sheets-Sheet 2
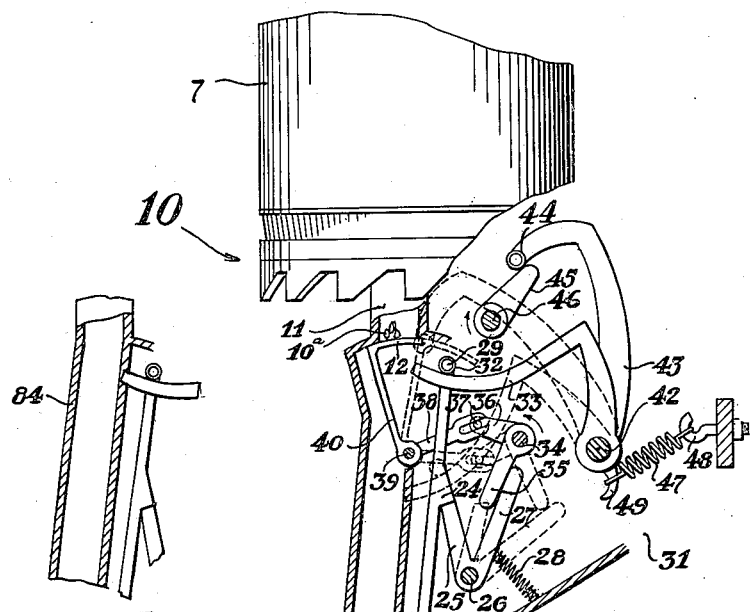
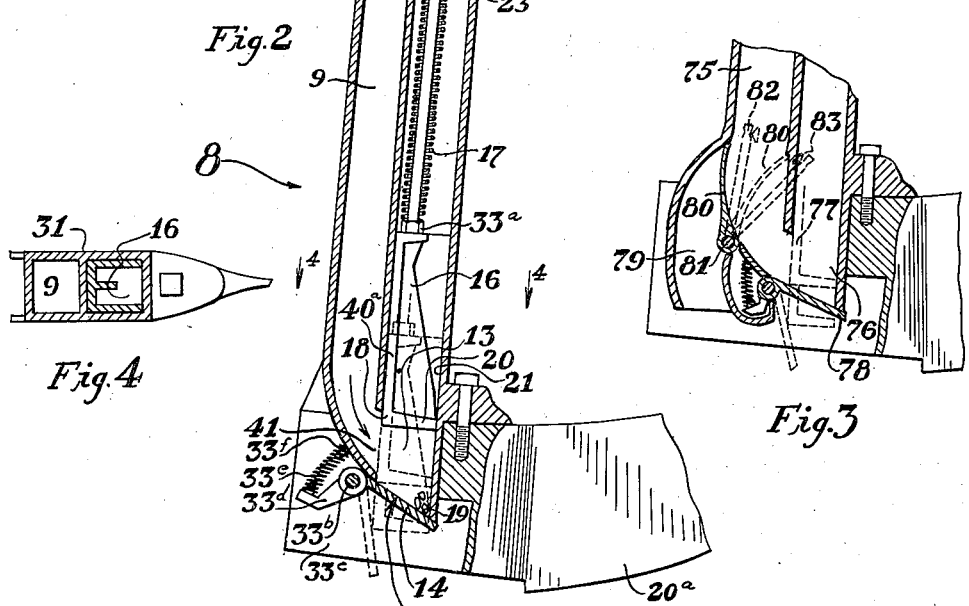
INVENTOR.
Harry R. Traphagen
BY Emerson B. Donnell
ATTORNEY Patented Jan. 13, 1942

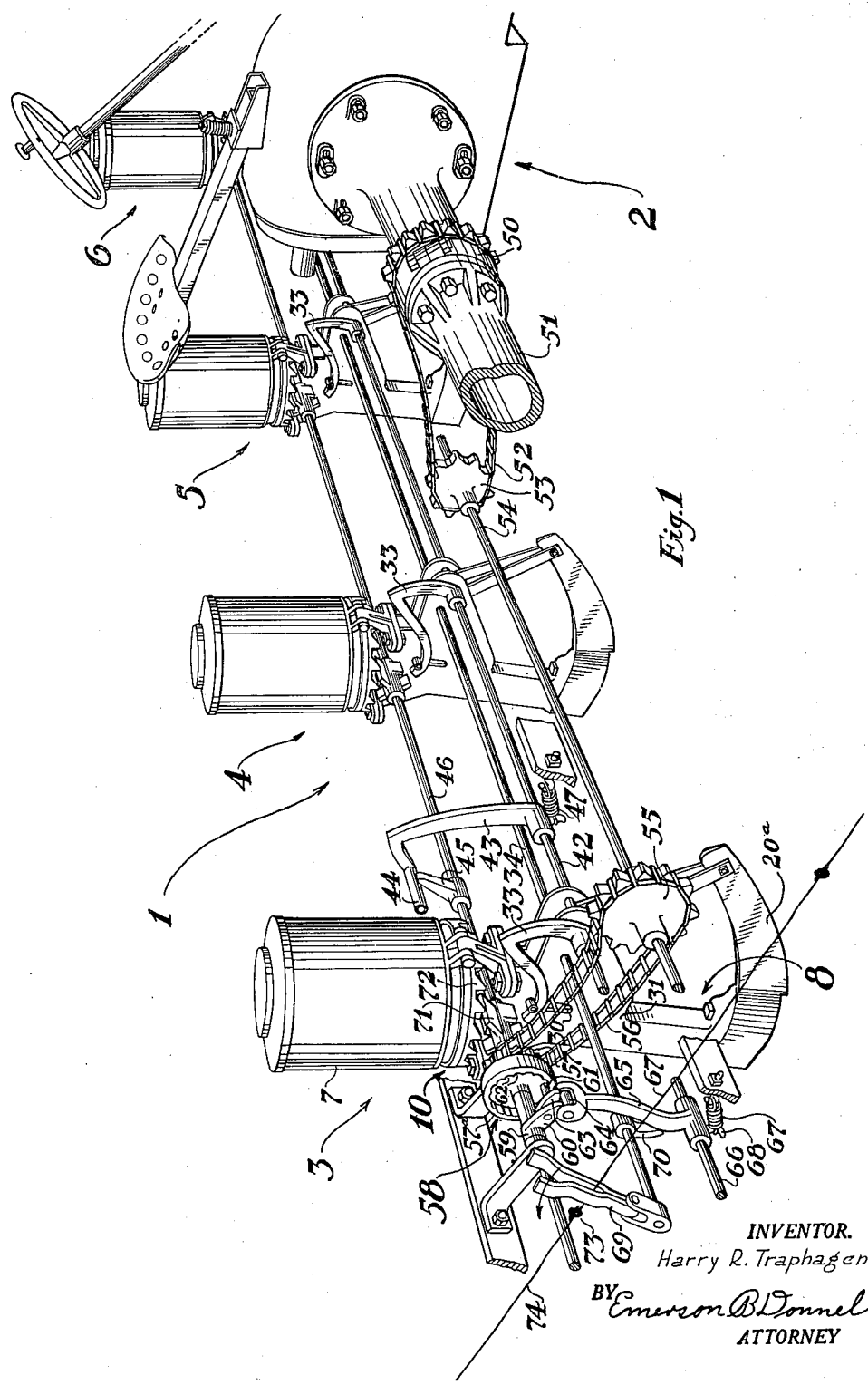

2,269,798

UNITED STATES PATENT OFFICE 2,269,798

PLANTING MEANS

Harry R. Traphagen, Rockford, Ill., assignor to J. I. Case Company, Racine, Wis., a corporation Application November 12, 1938, Serial No. 239,956

14 Claims. (Cl. 111—51)

The present invention relates to planters and an object of the invention is to generally improve the construction and operation of devices of this class.

A further object of the invention is to provide a new method of planting seed.

Further objects are to provide a planter which is particularly adapted to check-row planting and which will operate accurately while moving over the ground at substantially higher rates than heretofore; to avoid scattering of seed when planted at such higher rates; to avoid injury to seed planted in such manner; and to provide suitable mechanism for conveniently accomplishing the above objects.

Further objects and advantages will be apparent from the following specification and accompanying drawings in which:

Figure 1 is a perspective view, in the nature of a diagram and with parts omitted for clearness and others broken away, showing an illustrative embodiment of the invention applied to a tractor.

Fig. 2 is a vertical sectional view of a portion of the mechanism indicated in Fig. 1 partly diagrammatical.

Fig. 3 is a similar view of a portion of the mechanism shown in Fig. 2 showing a modified construction.

Fig. 4 is a sectional view taken on the line 4—4 of Fig. 2.

Fig. 5 is a view of a fragment of Fig. 2 showing a further modified construction.

Similar reference characters have been applied to the same parts throughout the drawings and specification.

As seen in Fig. 1 the device is embodied in a check-row planter generally designated as 1 which may be attached to or otherwise propelled by a tractor generally designated as 2. The planter would ordinarily be mounted on the tractor but this is not necessarily the case, and since Fig. 1 is largely diagrammatic in character no mounting means is shown in the present instance.

The present planter is shown for convenience as a 4-row machine comprising units 3, 4, 5 and 6, and since they are all alike only one will be described in detail.

Unit 3 for example comprises a seed box or reservoir 7 and a planting mechanism generally designated as 8.

As more particularly shown in Fig. 2 mechanism 8 includes an upright drop tube or casing 9, communicating at its upper end with reservoir 7 through a seed selecting, counting or measuring mechanism generally designated as 10, the details of the latter being well known. Selecting mechanism 10 measures seed 10a in the usual manner and drops it into an upward extension 11 of casing 9 where it accumulates as shown on a valve or gate 12, the individual seeds stopping at this point until predetermined quantity for one hill has been accumulated. At a predetermined time, as determined by the check-wire, valve 12 is moved by mechanism to be later described to the dotted line position shown whereupon the seed falls by gravity down drop tube 9 to an offset portion 13 of the drop tube and comes to rest temporarily on a gate or holding means 14 yieldably maintained against a seat portion 15 of the portion 13 which seat portion is preferably, although not necessarily inclined. At a predetermined subsequent time a plunger 16, pressed by a spring 17, is impelled from the full line to the lowermost dotted line position, a heel portion 18 contacting gate 14 as suggested and forcing the gate to open position although other means is contemplated as equivalent. The continuation or "follow through" movement of plunger 16 contacts the seed 19 an instant after the gate is open and before the seeds have had time to move appreciably by gravity, the flat head portion 20 contacting the seeds and driving or shooting them forcibly into the bottom of a furrow formed by a suitable opener 20a of well-known construction.

Due to the sloping position of gate 14 the seeds 19 accumulate in the angular space resulting between the plunger and gate so that the force of the plunger is not expended in compressing the seeds between the plunger and gate, which might possibly damage the seeds. On the contrary the plunger contacts the gate first and an instant later encounters the seed, the force of the impact in the preferred embodiment being only a function of the weight of the seeds themselves, so that the blow imparted to the seeds is in reality very small and considerable velocity can be given the seeds in this manner without cracking or otherwise damaging them. Plunger 16 is then retracted and the operation repeated for each hill planted.

Although gate 14 is removed from beneath the seeds before plunger 16 contacts the seeds, it is quite possible that the gate 14 could be opened by the force of the plunger acting on and through the seeds, and it is not intended to limit this application to actuation of the gate prior to contact of the plunger with the seed, or in fact in any manner except as defined by the claims.

In the past when planters have been operated at tractor speeds there has been difficulty with rolling of the seeds along the furrow owing to the relatively large horizontal component of motion resulting from the rapid movement of the tractor. In attempting to plant with a check wire this has resulted in serious scattering of the seed and uneven location of the hills. With the present invention the seeds are ejected forcibly and do not merely drop out of the seed tube as in prior practice. As a result they traverse the space between the seed tube and the ground in an extremely short time and may be made to embed themselves somewhat in the soft ground so that they remain in the exact spot where they first reached the ground. This effectively prevents rolling or scattering and permits reliable check-row planting at ordinary tractor speeds.

Returning to a detailed description of the present illustrative embodiment, plunger 16 is conveniently of generally square cross section, as more particularly shown in Fig. 4, although other shapes are contemplated as equivalent, and it is freely slidable in a runway 21 constituting part of offset portion 13. It has an upwardly extending stem 22 slidable through a guide portion 23, said stem having a lip 24 engaged by a latch or holding portion 25 pivoted on a pin or the like 26 for holding the plunger in retracted or "loaded" position. Latch 25 has a finger 27 defining a V-shaped element with portion 25, and pressed in a counter-clockwise direction by a spring 28 for engaging the latch beneath the lip as stem 22 is raised. The stem at its upper end has an offset portion 29 extending through a slot 30 (Fig. 1) to the exterior of a casing portion 31 constituting in the present instance a continuation of the structure of casing or drop tube 9. Portion 29 may advantageously, although not necessarily, carry a roller 32 beneath which is arranged a retracting arm 33.

Above mentioned spring 17 is arranged on stem 22 and compressed between guide 23 and a lock nut 33a to continuously urge the plunger downwardly.

Gate 14 is hinged, in the present instance at the edge nearest its point of contact with plunger 16, on a pin or the like 33b, carried in flanges as 33c or otherwise supported from drop tube or casing 9, and it has an arm 33d extending generally on the opposite side of the pin and engaging a spring 33e compressed between it and an anchorage 33f on the outside of the drop tube. The spring accordingly continuously urges the gate to the closed position shown.

A check actuated member or shaft 34 is oscillated at intervals by the check-wire as will appear, and carries a finger 35 engaged with above mentioned finger 27 so that upon counter-clockwise movement of the shaft and finger, finger 27, and accordingly latch 25, will be moved in a clockwise direction to remove the latch from beneath lip 24, releasing the plunger for its outward or "firing" movement.

Shaft 34 also has an arm 36 carrying a pin 37 engaging a bifurcated arm 38 fulcrumed on a pin or the like 39 carried by an upper portion of seed tube or casing 9. Pin 39 carries a generally upwardly extending portion 40 of above mentioned valve 12 which may be integrally or otherwise fastened to arm 38. The above described movement of shaft 34 accordingly causes downward movement of arms 36 and 38 and clockwise movement of valve portions 40 and 12.

It will be observed that the discharge of plunger 16 and the above described movement of valve 12 occur substantially simultaneously. Thus seeds 10a may be released for the passage down tube 9 at substantially the same time that plunger 16 is released for its firing movement. There is a delay however between the time the seeds leave valve 12 and the time they arrive at offset portion 13, and, the movement of plunger 16 being very rapid, the seeds will not have reached portion 13 until a wall portion 40a of plunger 16 has passed across a port 41 and blocked the entrance to portion 13. The seeds will accordingly be retained at this point until the plunger is retracted, when they will fall by gravity to a position resting on gate 14. The dimensions of the parts may be so chosen if desired that plunger 16 will have at least covered port 41 before valve 12 releases the seeds, although it is to be understood that the invention is not limited to such an arrangement.

Retracting arm 33 is connected, in the present instance through a shaft 42 journaled in casing 31, with an actuating arm 43. Arm 43 has a finger or follower 44 which may be engaged by a cam 45 fixed on a shaft 46 which is rotated in a clockwise direction at appropriate times as will appear. Finger 44 is urged downwardly by a spring 47 tensioned between any suitable anchorage as 48 and a hook or the like 49 extending from arm 43 and tending to rotate shaft 42 and its attached parts in a counter-clockwise direction as seen in Fig. 2. When released by cam 45 arms 43 and 33 are moved by spring 47 to the dotted positions leaving plunger 16 free to perform its ejecting stroke when released by latch 25. Later in the cycle finger 44 is engaged by cam 45, rotating arms 43 and 33 in a clockwise direction and retracting the plunger by contact of arm 33 with roller 32. It is contemplated that a separate arm 43 and cam 45 may be provided for each of the arms 33 if desired, whereupon shaft 42 may be omitted.

The necessary movements of shafts 34 and 46 may be obtained in various ways within the contemplation of the invention, in the illustrative embodiment the tractor 2 having a sprocket 50 mounted on the axle 51 thereof and driving, through a chain 52 and a sprocket 53, a countershaft 54. Countershaft 54 has a sprocket 55 driving, through a chain 56, a sprocket 57 fixed with the movable element 57a of a cycle clutch generally designated as 58, element 57a being journaled on shaft 46. A cam portion 59, also forming part of the clutch, is fixed on shaft 46 and has a cam 60 projecting therefrom and carrying a detent finger 61 engageable with seats or scallops 62 within clutch member 57a. Finger 61 has an extension or trigger portion 63 projecting beyond cam 60 in position to be contacted by a roller or the like 64 carried by an arm 65 pivoted as on a shaft 66 fixed with the planter structure in any suitable manner and urged, as by a spring 67 engaged with a hook or the like 68, into contact with cam 60. The finger 61 is normally urged, as by a spring or other well-known means not shown, into contact with seats 62, whereupon the rotation of portion 57a is imparted to cam portion 59 and accordingly to shaft 46. Rotation continues until cam 60 forces roller 64 in a direction away from shaft 46 after which trigger 63 encounters roller 64 which disengages finger 63 from the seats and permits portion 57a to continue rotating without driving shaft 46.

This is intended merely as a typical example of a suitable cycle clutch, and other arrangements are contemplated as equivalent.

Arm 65 is retracted from trigger 63 by the check wire, a check fork of suitable or well known form 69 being mounted on above mentioned check shaft 34, and the shaft having a finger 70 extending downwardly and engaging arm 65 above shaft 66.

Shaft 46 has a cam or pinion 71 arranged for driving a seed plate 72 constituting part of above mentioned seed dropping mechanism 10, the construction and operation of such mechanism being well known and constituting no part of the present invention it need not be further described.

The operation of the mechanism so far set forth is thought to be clear from the description, tractor axle 51 driving, through countershaft 54, clutch element 57a. At times when fork 69 encounters a button 73 on check wire or line 74, the fork is forced back in the direction indicated, oscillating check shaft 34. The following events then take place in rapid succession. Movement of shaft 34, referring to Fig. 2, removes latch 25 from lip 24 and "fires" plunger 16, which first closes port 41, then encounters gate 14 and opens it, immediately impacting seeds 19 and impelling them into the ground. This movement of shaft 34 simultaneously, or substantially so, removes valve 12 from beneath extension 11 and permits seeds 10a to drop down tube 9 to be in position to enter extension 13 as soon as plunger 16 is retracted. This movement of shaft 34 also moves arm 65, Fig. 1, away from trigger 63 in clutch 58, initiating rotation of shaft 46. Before shaft 46 is well started, button 73 will have slipped out of fork 69 and spring 67 will have returned check shaft 34 to its initial position, returning the valve 12 (Fig. 2) to the position shown. Rotation of shaft 46, however, will continue, and actuate seed plate 72, through pinion 71, to measure another hill of seed onto valve 12. Rotation of shaft 46 will also cause engagement of cam 45 with finger 44, oscillating shaft 42 in a clockwise direction and retracting plunger 16 as above described. Check shaft 34 extends through the several planter units as do shafts 42 and 46, so that the several units operate in unison as will be understood.

The arrangement shown in Fig. 3 provides a drop tube 75, an offset extension 76, a plunger 77 and a gate 78, all similar to and operating in the same manner as those described in connection with Fig. 2. However, a by-pass 79 is provided opening at about or slightly above the level of gate 78, and a valve element 80 constituting a portion of the wall of drop tube 75 is fixed on a rotatable pin 81 extending outside the drop tube and having a lever 82 for rotating the pin for shifting the valve element. When the checkrow operation is not desired valve element 80 may be moved to the dotted position and maintained as by engagement of lever 82 with a detent 83, and the check fork held back in any suitable manner not shown, whereupon above mentioned shaft 46 will rotate continuously and seed will be discharged from by-pass 79 as fast as it is measured by seed plate 72.

This type of operation may also be obtained by holding gate 14 continuously open and plunger 16 retracted by any suitable means, under the above conditions, and without resort to the special construction of Fig. 3.

In the construction shown in Fig. 5, upper valve 12 is dispensed with and a drop tube 84 extends directly from the seed plate to the extension (not shown) but which will be understood to be identical with extension 13 of Fig. 2. Under certain conditions the use of upper valve 12 is found to be unnecessary, and when this is the case, the complication of its actuating means can be omitted.

The above being a complete description of illustrative embodiments of the invention, what is claimed as new and desired to be secured by Letters Patent of the United States is:

1. In a planter, the combination of a furrow opener, seed holding means and means for measuring seed from said seed holding means, a drop tube positioned to receive seed from the measuring means and extending to said opener, a gate at the end of the drop tube, a spring pressed plunger adapted to reciprocate in said drop tube, means for raising said plunger away from said gate for the accumulation of seed from the measuring means at the gate, means engaging the plunger for retaining it away from the gate, and means including a check line and a member engaging said line for removing said retaining means from engagement with the plunger for releasing the plunger for actuation by the spring pressure for forcible movement in the drop tube and contact with the seed accumulated at the gate for forcibly ejecting said seed from the drop tube into the ground.

2. In a planter, the combination of a furrow opener, seed holding means, means for measuring seed from said seed holding means, a casing positioned to receive seed from the measuring means and extending to said opener, a gate at the end of the casing, a spring pressed plunger adapted to reciprocate in said casing and having a portion positioned to contact the gate at a predetermined position in the travel of the plunger, means for yieldingly holding the gate in closed position whereby it will be opened by contact of the plunger, means for raising said plunger away from said gate for the accumulation of seed from the measuring means at the gate, means engaging the plunger for retaining it away from the gate, means including a check line and a member engaging said line for removing said retaining means from engagement with the plunger for releasing the plunger for forcible movement in the casing in response to the spring pressure for opening the gate and for contact with the seed accumulated at the gate for forcibly ejecting said seed from the casing into the ground.

3. In a planter, a tube, a seed ejecting plunger, said plunger being adapted to reciprocate in said tube from a position entirely within the tube to a position projecting from the outlet end of the tube, resilient means urging the plunger in a seed ejecting direction, holding means adapted to retain the plunger in retracted position, a check line, and means engaging the check line for actuating said holding means for releasing the plunger for ejecting movement, an inclined seat at the outlet end of the tube, a hinged gate in contact with the inclined seat, said gate adapted to be opened by the plunger contacting the gate during seed ejecting movement, means for yieldingly holding the gate in contact with the seat, said plunger having a face substantially perpendicular to its direction of travel whereby a space will exist between the plunger and the gate when the plunger is in a position contacting the gate, and means for accumulating seed and delivering it to the gate, said seed adapted to be supported on said gate and to be carried within said space to avoid crushing of the seed between the plunger and gate when the plunger contacts the gate, whereby the plunger may first open the gate and subsequently contact the seed for forcibly expelling it from the tube.

4. In a planter, having a casing portion, an ejecting plunger and means continuously urging said plunger in an ejecting direction, a shaft adapted to rotate one revolution for each desired ejection, a cam on the shaft, a follower positioned to be engaged by the cam, an arm connected with and supporting the follower, said arm being supported for oscillation from said casing portion, and a retracting arm connected with the first mentioned arm and adapted to retract the plunger against the pressure of said means upon actuation of the cam follower by rotation of said shaft.

5. In a planter, including a plurality of planting units each including a casing portion, and an ejecting plunger and means continuously urging said plunger in an ejecting direction, a first shaft adapted to rotate one revolution for each desired ejection, a cam on the shaft, a follower positioned to be engaged by the cam, an arm connected with and supporting the follower, a second shaft supporting the arm and traversing, and supported for oscillation in the several casing portions, and a plurality of retracting arms on the second shaft and connected to retract the several plungers against the pressure of said means upon actuation of the cam follower by rotation of said first shaft.

6. In a check-row planter, a casing, an ejecting plunger reciprocable in the casing, resilient means continuously urging the plunger in an ejecting direction, a latch adapted to engage the plunger and retain it in a retracted position, a check shaft supported for oscillation in the casing, a connection from the check shaft adapted to remove the latch from engagement with the plunger, and means engaging a check-wire for oscillating the check shaft at predetermined times.

7. In a check-row planter, the combination of a seed supply, a casing, a seed ejecting plunger reciprocable in the casing, resilient means continuously urging the plunger in an ejecting direction, latch means adapted to retain the plunger in retracted position, a check-wire, tripping means at predetermined points on the check-wire, actuating means adapted to be operated by the tripping means, a power supply, driving mechanism adapted to operate through a single predetermined cycle when connected to said power supply, seed measuring means connected to said driving mechanism, plunger retracting mechanism connected to said driving mechanism, and connections from said actuating means for releasing said latch means for a seed ejecting stroke of the plunger, and for connecting said driving mechanism to said power supply for retracting said plunger and measuring a quantity of seed prior to a subsequent ejecting movement of said plunger.

8. In a planter, a casing, a seed ejecting plunger reciprocable in the casing, resilient means adapted to continuously urge the plunger in a seed ejecting direction, a lip on the plunger, a V-shaped latch element pivoted at its apex and having one finger engaged beneath said lip, a check shaft supported for oscillation in the casing, a cam on the check shaft and extending into engagement with the other finger of the V-shaped latch, and means for oscillating the check shaft at predetermined intervals for removing the latch from engagement with the lip to release the plunger for ejecting movement.

9. In a planter, a casing including a drop tube, a seed supply, a seed ejecting plunger reciprocable in a portion of the drop tube, seed measuring means beneath the seed supply and adapted to measure seed into the drop tube, a valve in the drop tube beneath the seed measuring means and above the portion in which said plunger is reciprocable, means adapted to continuously urge the plunger in a seed ejecting direction, a latch for holding the plunger in a retracted position in opposition to the urging means, trip means connected for releasing the latch, and connections from the trip means for also opening the valve at times when the trip means is actuated for releasing the latch for an ejecting stroke of the plunger.

10. In a planter, a tube, a seed ejecting plunger reciprocable in the tube and being adapted to move from a position entirely within the tube to a position projecting from the outlet end of the tube, resilient means urging the plunger in a seed ejecting direction, holding means adapted to retain the plunger in a retracted position against the pressure of said resilient means, a check line and means engaging the check line for actuating said holding means for releasing the plunger for ejecting movement, a seat at the outlet end of the tube, a hinged gate in contact with the seat, said gate adapted to be opened by the plunger contacting the gate during seed ejecting movement, means for yieldingly holding the gate in contact with the seat, a face on the plunger, said face and said seat being so disposed relatively to each other as to result in a space between the plunger and the gate when the plunger is in a position contacting the gate, and means for accumulating seed and delivering it to the gate, said seed adapted to be supported on said gate and to be carried within said space to avoid crushing of the seed between the plunger and gate when the plunger contacts the gate, whereby the plunger may first open the gate and subsequently contact the seed for forcibly expelling it from the tube.

11. In a planter, a casing, a seed ejecting plunger reciprocable in the casing, resilient means adapted to continuously urge the plunger in a seed ejecting direction, a latch element supported for movement in the casing, means on the plunger engaging said latch element, a check shaft supported for movement on the planter, means on the check shaft extending into engagement with said latch element, and means for moving the check shaft at predetermined intervals for removing said latch element from engagement with said means on the plunger to release the plunger for ejecting movement.

12. In a check row planter a casing, an ejecting plunger reciprocable in the casing, resilient means continuously urging the plunger in an ejecting direction, retaining means adapted to engage the plunger and retain it in a retracted position, a check actuated member supported for movement in the casing, a connection from the check actuated member adapted to remove said retaining means from engagement with the plunger, a power supply, means actuated from the power supply for retracting the plunger and means engaging a check line for actuating the check actuated member at predetermined times.

13. In a check row planter a casing, an ejecting plunger reciprocable in the casing, resilient means continuously urging the plunger in an ejecting direction, retaining means adapted to engage the plunger and retain it in a retracted position, a check actuated member supported for movement in the casing, a connection from the check actuated member adapted to remove said retaining means from engagement with the plunger for a seed ejecting stroke of said plunger, a power supply, a driving mechanism adapted to operate through a single predetermined cycle when connected to said power supply, a plunger retracting mechanism connected to said driving mechanism and connections from said check actuated member for connecting said driving mechanism to said power supply for retracting said plunger, and means engaging a check line for actuating the check actuated member at predetermined times.

14. In a check row planter a casing, an ejecting plunger reciprocable in the casing, resilient means continuously urging the plunger in an ejecting direction, retaining means adapted to engage the plunger and retain it in a retracted position, a check actuated member supported for oscillation in the casing, a connection from the check actuated member adapted to remove said retaining means from engagement with the plunger, a power supply, a driving mechanism adapted to operate through a single predetermined cycle when connected to said power supply, a plunger retracting mechanism connected to said driving mechanism, connections from said check actuated member for connecting said driving mechanism to said power supply for retracting said plunger, and means engaging a check line for actuating the check actuated member at predetermined times.

HARRY R. TRAPHAGEN.